United States Patent

[11] 3,572,785

| [72] | Inventor | Darrell R. Larson<br>Salt Lake City, Utah |
|---|---|---|
| [21] | Appl. No. | 887,065 |
| [22] | Filed | Dec. 22, 1969 |
| [45] | Patented | Mar. 30, 1971 |
| [73] | Assignee | Minneapolis Electric Steel Castings Company<br>Minneapolis, Minn. |

[54] CONNECTING APPARATUS FOR POWER SHOVEL TOOTH ADAPTERS
6 Claims, 5 Drawing Figs.

| [52] | U.S. Cl. | 287/103, 37/142, 85/8.3 |
|---|---|---|
| [51] | Int. Cl. | B25g 3/36 |
| [50] | Field of Search | 37/142, 142 (R); 85/8.3; 299/92; 287/103 (Cursory) |

[56] References Cited
UNITED STATES PATENTS

| 2,772,492 | 12/1956 | Murtaugh | 37/142 |
| 3,121,289 | 2/1964 | Eyolfson | 287/103X |
| 3,126,654 | 3/1964 | Eyolfson et al. | 37/142 |

*Primary Examiner*—David J. Williamowsky
*Assistant Examiner*—Andrew V. Kundrat
*Attorney*—Merchant & Gould ABSTRACT: The disclosure is directed to apparatus for connecting a digger tooth adapter to an excavating shovel. The apparatus consists of a C-shaped block having undulations formed on its back side, and a wedge having a resiliently mounted block-engaging member of the face of which is also undulated to cooperate with the block. The adapter and lip of the shovel fit together in overlapping relation, with openings in each aligning to form a passage which receives the block and wedge.

PATENTED MAR30 1971
3,572,785
FIG_1 FIG_2 FIG_5
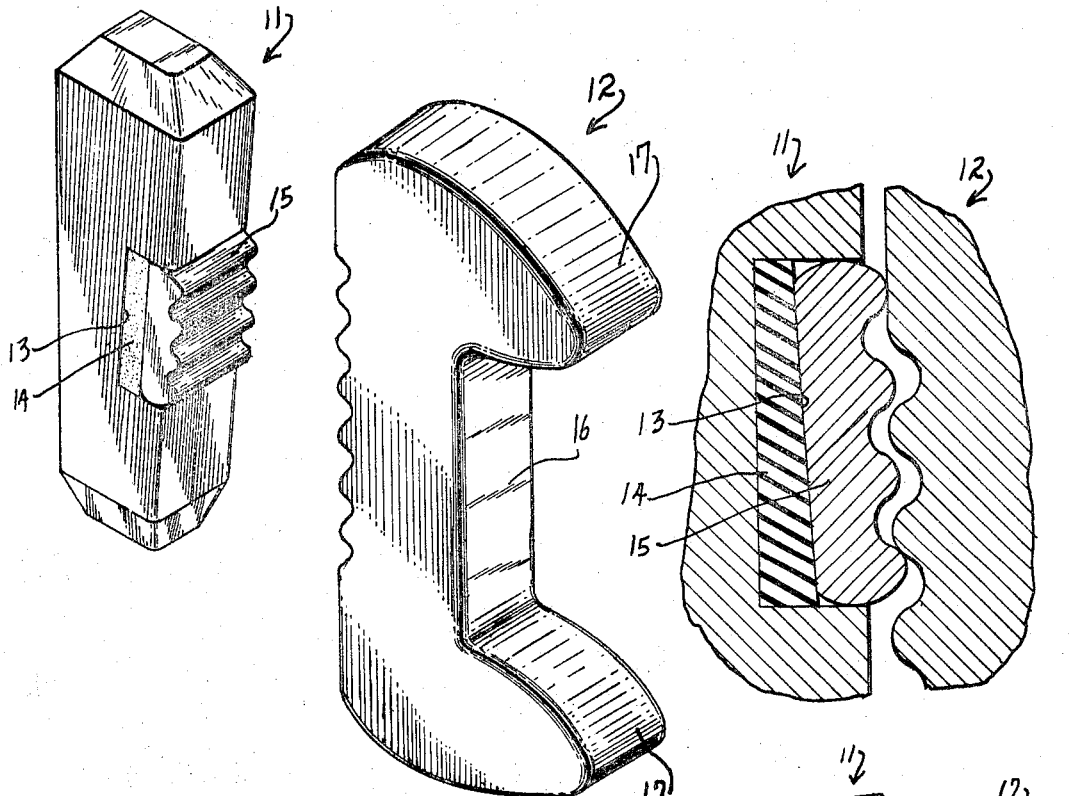
FIG_3
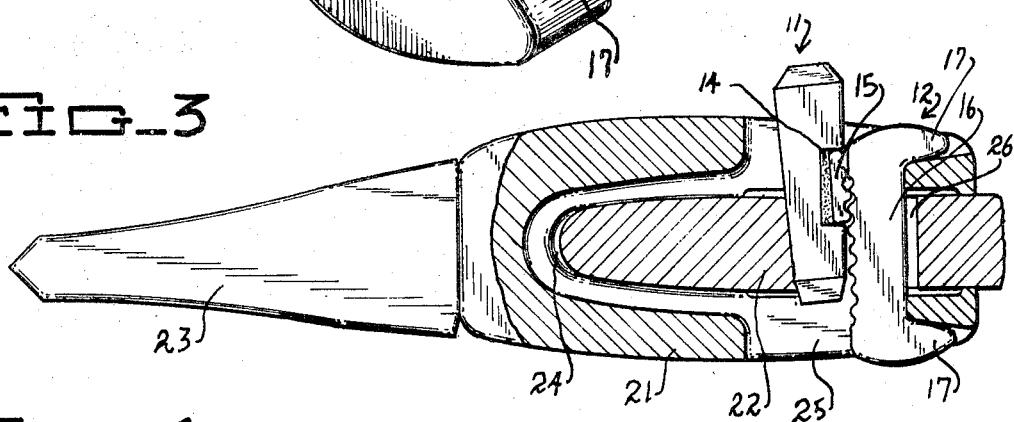
FIG_4
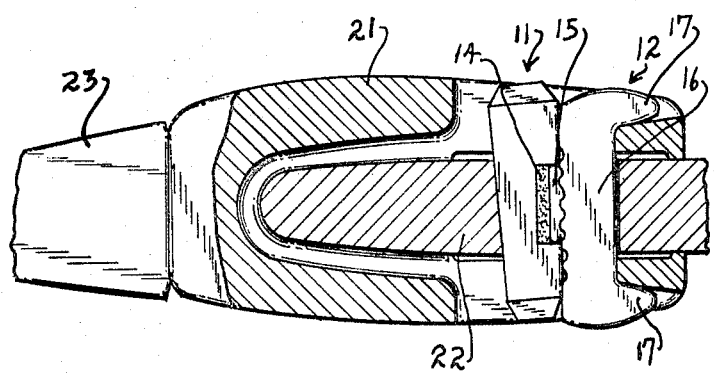
INVENTOR.
DARRELL R. LARSEN
BY
Merchant & Gould
ATTORNEYS

CONNECTING APPARATUS FOR POWER SHOVEL TOOTH ADAPTERS

The invention is generally related to the field of connecting devices for heavy machinery and is specifically intended for use with tooth adapter assemblies for excavating shovels.

The excavation and processing of ore and hard rock requires heavy machinery which is subject to rapid and excessive wear. The existing practice for some ore mining machinery is to make the ore-engaging parts subject to such wear replaceable through the use of adapters. Excavating shovels, for instance, include digger tooth adapter assemblies which are removably connected to the shovel lip and carry replacement digger teeth which can be removed and replaced relatively easily.

Because of the extreme forces involved, the means for connecting the adapter to the shovel lip must be extremely heavy duty, easily operated to permit simple connection and disconnection and designed not to work loose as the result of vibration and shock.

One of the more common methods of connection employs a wedge alone or in combination with a clamping block. Openings are formed in the adapter and shovel lip, and when brought together in overlapping relation the openings align to form a continuous passage at the pint of connection. The clamping block and/or wedge are inserted into the passage, wedging between the shovel lip and adapter to form the connection.

The most prominent difficulty with the wedge connector lies in its tendency to loosen through vibration and shock, which can result in the tooth adapter becoming disconnected from the shovel.

My invention is directed to connecting apparatus that solves this problem, which is easily inserted and removed and requires no additional operation or structure to hold the apparatus in place once it has been inserted.

BRIEF DESCRIPTION OF THE DRAWINGS

FIG. 1 is a perspective view of a wedge connector intended for use with a tooth adapter assembly;

FIG. 2 is a perspective view of a C-clamp used in conjunction with the wedge connector;

FIG. 3 is a partial sectional view of a tooth adapter assembly being connected to the lip of an excavating shovel by the C-clamp and wedge connector;

FIG. 4 is the view of FIG. 3 with the wedge connector in place; and

FIG. 5 is an enlarged sectional view of the retaining portions of the wedge connector and C-clamp.

DESCRIPTION OF THE PREFERRED EMBODIMENT

FIGS. 1 and 2 respectively show respective views of a wedge 11 and a C-clamp 12 which constitute the inventive connecting apparatus.

Wedge 11 is a tapered, elongated member, the ends of which are chamfered to lessen deformation resulting from pounding during insertion and removal. Disposed in one face of wedge 11 intermediate its ends is a recess 13 which is rectangular in shape and has a predetermined depth. A pad 14 of resilient material is placed in recess 13 which resiliently separates the base of recess 13 from a locking member 15 the front face of which is undulated as shown. The upper and lower edges of member 15 abut the upper and lower surfaces of recess 13, thus precluding member 15 form moving longitudinally and being sheared from pad 14 during insertion of wedge 11. Preferably, pad 14 is made of rubber and is bonded to both the surface defining recess 14 and locking member 15.

C-clamp 12 is a single piece, comprising an elongated member 16 with projections 17 extending laterally from either end. The rear face of elongated member 16 is formed with undulations which mate and cooperate with those of locking member 15.

FIG. 3 shows the wedge 11 and C-clamp 12 in combination with a tooth adapter assembly 21 and the lip 22 of an excavating shovel. Tooth adapter 21 carries a digging tooth 23 by means not shown, and forms no part of the subject invention. A horizontal opening 24 is formed in tooth adapter 21 in conventional manner to receive shovel lip 22 in overlapping relation. Both tooth adapter 21 and shovel lip 22 have vertical openings 25 and 26, respectively, which become aligned when tooth adapter 21 and lip 22 are properly engaged and oriented to form a continuous vertical passage. Openings 25 and 26 must be of sufficient dimension to enable the projections 17 of C-clamp 12 to pass therethrough. Projections 17 must be spaced sufficiently apart to receive and engage the thickness of tooth adapter 21 as shown. Wedge 11 can then be inserted into the vertical passage, where it wedges between C-clamp 12 and shovel lip 22. C-clamp 12 reacts by clamping against tooth adapter 21, so that the overall tendency is to wedge tooth adapter 21 and shovel lip 22 together (FIG. 4).

Referring now to FIG. 5, it can be seen that locking member 15 is constructed and arranged to "rock" against pad 14 as it slides downwardly and engages the undulated portion of C-clamp 12. This is a primary feature of the connecting apparatus since it permits positive engagement when the respective undulated portions are mated, as shown in FIG. 4, thus holding wedge 11 in place to tightly connect tooth adapter 21 and shovel lip 22. The unit can then be subjected to severe shock and vibration and wedge 11 will not be loosened.

A striking force on the bottom of wedge 11, however, causes locking member 15 to "rock" within recess 13, permitting its removal with no difficulty. C-clamp 12 can then be removed from the vertical passage, and tooth adapter 21 can be removed from shovel lip 22 for maintenance, repair or replacement. The plurality of undulations on both C-clamp 12 and locking member 15 enable wedge 11 to be driven to any position with respect to C-clamp 12, thereby compensating for nonuniformity in part size and wear of the parts themselves. The fact that the edges of locking member 15 abut the top and bottom walls of recess 14 prevent shear forces arising from relative movement between wedge 11 and C-clamp 12 from carrying member 15 from pad 14. The result is an extremely strong and reliable connecting apparatus that is easily inserted and removed, and yet gives positive, unloosening connection between the connected parts.

I claim:

1. Apparatus for removably connecting two separable parts, the parts fitting together in overlapping relation and each having an opening, the openings being alignable to form continuous passage when the parts are brought together, the connecting apparatus comprising:

a. an elongated block having projections extending laterally from either end, the projections being of such length as to permit insertion of the block into the continuous passage, and spaced to receive therebetween one of the two parts, the back side of the block having undulations formed therein;

b. a wedge dimensioned for insertion into the passage in wedging relation between the block and the other of the two parts, one side of the wedge having a recess intermediate its ends, the recess being lined with a resilient pad of a predetermined thickness;

c. and a block-engaging member disposed in the recess and having an undulated block-engaging face for matable engagement with the undulations in said block, the block-engaging member constructed and arranged for rockable movement within the recess upon engagement with the block.

2. The apparatus as defined by claim 1, wherein the resilient pad is rubber.

3. The apparatus as defined by claim 2, wherein the rubber is bonded to the surface defining the recess and to the block-engaging member.

4. The apparatus as defined by claim 1, wherein the recess is rectangular in shape.

5. The apparatus as defined by claim 1, wherein the top and bottom edges of the block-engaging member abut the upper and lower surfaces of the recess, thus precluding relative longitudinal movement therebetween.

6. Apparatus for removably connecting two separable parts, the parts fitting together in overlapping relation and each having an opening, the respective openings being alignable to form a continuous passage when the parts are brought together, the connecting apparatus comprising:

an elongated block having projections extending laterally from either end, the projections being of such length as to permit insertion of the block into the continuous passage and spaced to receive one of two parts therebetween;

a wedge dimensioned for insertion into the passage in wedging relation between the block and the other of the two parts;

one of said elongated block and wedge having an undulated engaging face;

the other of said elongated block and wedge having a recess intermediate its ends, the recess being lined with a resilient pad of predetermined thickness; and an engaging member disposed in said recess and having an undulated engaging face for matable engagement with the undulated engaging face of said one elongated block and wedge, the engaging member constructed and arranged for rockable movement within the recess.